United States Patent
Janicek (10) Patent No.: US 6,249,104 B1
(45) Date of Patent: Jun. 19, 2001

(54) CUTOUT START SWITCH HEATING

(75) Inventor: Alan Joseph Janicek, Morrison, IL (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/346,034

(22) Filed: Jul. 1, 1999

(51) Int. Cl.⁷ .................................................. H02P 1/44
(52) U.S. Cl. .................... 318/791; 318/781; 318/782; 318/783; 318/790; 361/23; 361/24; 361/25; 361/26; 361/27
(58) Field of Search ................................ 318/778, 782, 318/783, 790, 791; 361/23–27

(56) References Cited

U.S. PATENT DOCUMENTS

| | | | |
|---|---|---|---|
| 4,084,202 | * | 4/1978 | Stoll ........................................ 361/24 |
| 4,100,468 | * | 7/1978 | Slocum ............................. 318/221 C |
| 4,161,681 | * | 7/1979 | Rathje ................................... 318/783 |
| 4,241,494 | * | 12/1980 | Woods .................................... 29/619 |
| 4,355,458 | * | 10/1982 | Wools et al. ............................ 29/602 |
| 4,387,330 | * | 6/1983 | Zigler ..................................... 318/788 |
| 4,546,918 | * | 10/1985 | Bohan, Jr. .......................... 236/46 R |
| 5,212,436 | * | 5/1993 | Nacewicz et al. .................... 318/788 |
| 5,729,416 | * | 3/1998 | Renkes et al. ......................... 361/23 |

* cited by examiner

Primary Examiner—Robert E. Nappi
Assistant Examiner—Rita Leykin
(74) Attorney, Agent, or Firm—Carl B. Horton, Esq.; Damian Wasserbauer, Esq.; Armstrong Teasdale, LLP (57) ABSTRACT

A motor start switch includes a temperature responsive resistor element and a cutout switch electrically connected in series with a start winding of an electric motor. The cutout switch is in thermal contact with the temperature responsive resistor element so that heat from the temperature responsive resistor element is transferred to a bimetal element in the cutout switch, causing the bimetal element to open the switch. Heat from a motor overload protector provides heat to maintain the bimetal element in an open position. As heat to operate the temperature responsive resistor element is obtained from existing circuit elements, the efficiency rating of the motor is unaffected.

19 Claims, 4 Drawing Sheets

CUTOUT START SWITCH HEATING

BACKGROUND OF THE INVENTION

This invention relates generally to electric motors and, more particularly, to a start winding cutout switch for a refrigerator compressor motor.

Electric motors typically include a start winding, a run winding and a magnetized rotor. The start winding is used to initiate rotation of the rotor. The run winding has a high inductive reactance relative to the start winding, so that the magnetic fields generated in the respective windings are out of phase with one another. The geometric time phase relationship between the magnetic fields causes the rotor to begin to rotate from a standstill condition when the windings are energized. Once the rotor has sufficient torque to attain its normal running speed, the start winding is "cut-out" of the motor circuit so that the geometrically spaced out-of-phase magnetic field generated by the start winding does not adversely affect motor operation. The start winding may be utilized as an auxiliary run winding after motor start-up by connecting a run capacitor in series with the start winding. Often, a run capacitor results in better motor efficiency and power factor.

A positive temperature coefficient resistor (PTCR) may be used to regulate the current flowing through the motor start winding. A PTCR is a temperature responsive resistor element that has a low resistance in a cool state, but a very high resistance when heated to an "anomaly temperature" or "Curie Temperature." When a PTCR is connected in series with a start winding, the low initial resistance in the cool state allows the start winding to draw a relatively large current to accomplish initial motor rotation. The current heats the PTCR until the Curie Temperature, and the very high resistance state, is reached. Very little current, therefore, flows into the start winding as the PTCR restricts or "chokes off" the current to the start winding to negligible levels. By selecting a PTCR having a Curie Temperature which is reached at approximately the same time that the motor running speed is achieved, a PTCR effectively and reliably regulates current flow into the start winding.

A PTCR, however, consumes 2–3 watts of power to maintain the high resistance state at the Curie Temperature. In light of stringent energy consumption standards, PTCR energy consumption is a factor in the efficiency rating of a compressor motor. PTCR energy consumption can be reduced, and the efficiency rating of a motor increased, by connecting a bimetal cutout switch in series with the PTCR. Current flowing through the switch heats a bimetal element therein, causing the switch to open and electrically disconnect the PTCR so that, except for the minute power loss in the wires and electrical connections, electrical power to the motor is dissipated only in the run and start windings. Thus, the energy efficiency rating of the motor is increased.

Depending on the characteristics of the bimetal element and the magnitude of the run current flowing through the bimetal cutout switch, additional heat may be needed to open the bimetal cutout switch element, or to maintain the bimetal cutout switch in the open position.

Accordingly, it would be desirable to provide additional heat to the cutout switch without compromising the energy efficiency of the motor.

BRIEF SUMMARY OF THE INVENTION

In an exemplary embodiment of the invention, a motor start switch includes a temperature responsive resistor element electrically connected in series with the start winding of a motor. A cutout switch is electrically connected in series with the temperature responsive resistor element. The temperature responsive resistor element is a positive temperature coefficient resistor ("PTCR") positioned in thermal contact with the bimetal cutout switch. In addition to heat from the current flowing through the switch, the bimetal element of the cutout switch receives heat from the PTCR to facilitate the opening of the switch. Once opened, current continues to flow through the cutout switch bimetal element, thereby generating heat in the switch to keep the switch open.

In a second embodiment, the cutout switch bimetal element is placed in thermal contact with both the PTCR and a motor overload protector that protects the motor from excessive current, prolonged current and other fault conditions. The motor overload protector includes a heating element that cooperates with a bimetal element to disconnect power to the motor upon the occurrence of specified conditions. By locating the cutout switch in proximity to the overload protector, the overload protector may also be used as a heat source for the cutout switch bimetal element. Thus, additional heat from both the PTCR and the overload is provided to the bimetal element to open the switch. When the cutout switch is opened, current does not flow through the cutout switch bimetal element. Rather, heat to maintain the bimetal element in the open position is received from the overload protector.

The additional heat to open and maintain the cutout switch in the open position is generated by existing motor circuit elements. Therefore, no additional power is required to operate the cutout switch, and the efficiency rating of the motor is maintained.

DETAILED DESCRIPTION OF THE INVENTION

Figure 1:
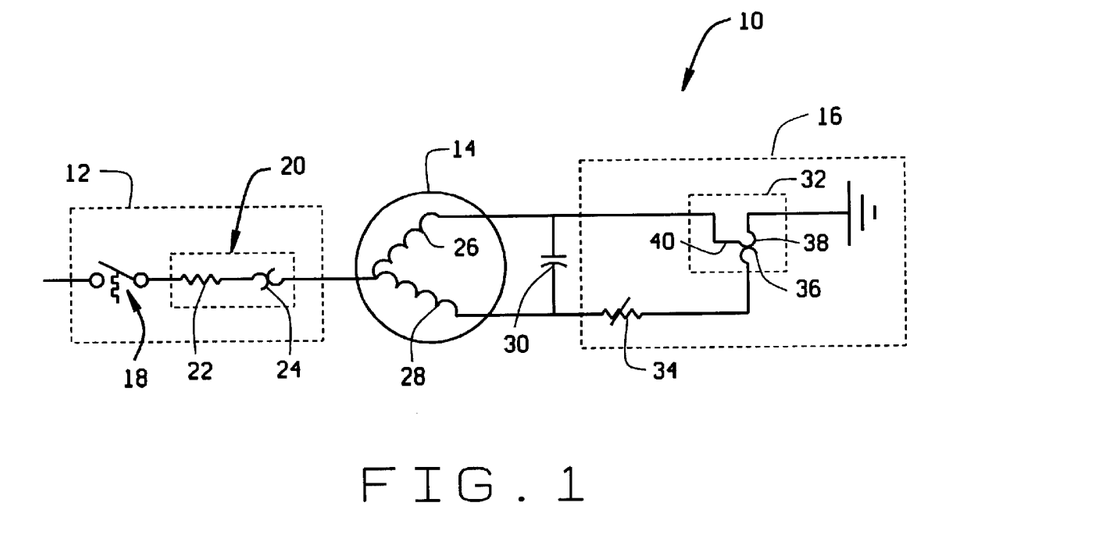
FIG. 1 is a circuit schematic of a refrigerator compressor circuit including a start switch in a closed position.

FIG. 1 is a circuit schematic of a refrigerator compressor 10 including a motor control 12, a motor 14, and a motor start switch 16. Motor control 12 is electrically connected in series with motor 14 and includes a thermostat 18 and an overload protector 20. Thermostat 18 connects compressor 10 to an electrical power source (not shown) and cycles motor 14 from an "ON" state to an "OFF" state upon occurrences of selected conditions.

Overload protector 20 includes a heater element 22 in thermal contact with a bimetal element 24. When motor 14 is "ON," current flows through resistance heater element 22 and bimetal element 24 to motor 14. In instances of excessive, or prolonged, current flowing through heater element 22 to motor 14, or upon other specified fault conditions, heater element 22 reaches a predetermined temperature that causes bimetal element 24 to open and break electrical contact with motor 14. Overload protector 20 therefore protects motor 14 from overheating and burnout. The predetermined temperature which causes bimetal element 24 to open is selected to keep the motor winding temperature to less than a maximum temperature specified by the compressor motor manufacturer.

Motor 14 includes a run winding 26, a start winding 28, and a run capacitor 30 electrically connected to one another. Run capacitor 30 is electrically connected in series with start winding 28 so that start winding 28 remains in the motor circuit as an auxiliary run winding. In an alternative embodiment, motor 14 includes one or more auxiliary windings electrically connected in series with start winding 28.

Start switch 16 includes a cutout switch 32 and a temperature responsive resistor 34 electrically connected in series with start winding 28 and in parallel with run capacitor 30. Cutout switch 32 includes a stationary contact 36, a movable contact 38, and a bimetal element 40 connected to moveable contact 38. Cutout switch 32 has an open position and a closed position. In the closed position, stationary contact 36 and movable contact 38 form an electrical connection through cutout switch 32. In the open position, stationary contact 36 and movable contact 38 are separated from one another which prevents an electrical connection, i.e., prevents current flow, through cutout switch 32.

Bimetal element 40 includes two metallic strips (not shown) connected to one another. Each metallic strip has a different coefficient of thermal expansion so that each strip expands at a different rate. As current flows through bimetal element 40 heat is generated within bimetal element 40, causing the metallic strips to expand. However, since the metallic strips expand at different rates, bimetal element 40 bends or curls as the metallic strips are heated. Therefore, at a predetermined temperature, i.e., the transition temperature, bimetal element 40 curls or deflects, causing moveable contact 38 to separate from stationary contact 36 and to open or break the electrical circuit through cutout switch 32. Bimetal element 40 may be a snap action or creep type bimetal element. Unlike relay and other electrical switches, which require external electrical power to open and close the contacts, bimetal element 40 mechanically opens and closes cutout switch 32. Therefore, in contrast to a relay switch, additional power in not required to open or close the switch.

Temperature responsive resistor 34 is a positive temperature coefficient resistor (PTCR) having a low resistance when in a cool state and a high resistance when in a heated state. An exemplary temperature responsive resistor 34 is a disk type PTCR, such as a PTCR disk available from CeraMite, a company located in Grafton, Wis. PTCR 34 is selected to be the minimum size which satisfies resistance/current/voltage conditions to optimize the cooling rate of PTCR 34. PTCR is separated from, or external to, start winding 28. In an alternative embodiment, PTCR 34 is internal to, or part of, start winding 28.

Exemplary ratings of PTCR 34 are set forth below:
Cold Resistance, 5 ohms to 15 ohms, 180 vac, 12 amp
Maximum Curie Temperature 125 C.
5.5 ohms resistance at 25 C.
Life: 50,000 starts (minimum). A PTCR 34 satisfying the above ratings effectively disconnects, or takes out, start winding 28 in less than 0.75 –1.0 seconds at 8.0 amps during the motor startup for a cold start, and resets within 80 seconds in the event that power is cut-off.

Cutout switch bimetal element 40 is selected to reach its predetermined transition temperature so that bimetal element 40 opens and breaks the circuit at approximately the same time as PTCR 34 reaches the Curie Temperature. Suitable bimetal-type switches for this application are commercially available from Otter Controls, Limited, Hardwick Square South, Buxton, Derbyshire, SK17, 6LA, England. The transition temperature of bimetal element 40 is selected based on motor current and application conditions so that bimetal element 40 deflects after PTCR 34 reaches the Curie temperature but before overload protector 20 breaks electrical power to motor 14.

When electrical power is initially delivered to motor 14 through thermostat 18 and overload protector 20, cutout switch 32 is closed so that an electrical circuit is completed through stationary contact 36 and moveable contact 38. Also, PTCR 34 is well below the Curie Temperature and in the state of low resistance, so that when power is delivered to motor 14, relatively large startup currents flow through start winding 28 to generate the start winding magnetic field, and thus the desired torque, which causes the rotor (not shown) to begin rotating from a standstill condition. Upon startup, both run winding 26 and start winding 28 are energized, and the resistance of PTCR is sufficiently low so that run capacitor 30 is substantially electrically disassociated from run winding 26 and start winding 28. The magnetic field generated by start winding 28 is, for example, about 30 out-of time phase from the magnetic field generated by run winding 26.

The current flowing through cutout switch 32 causes bimetal element 40 and PTCR 34 to heat up. As PTCR 34 heats up, less current flows through PTCR 34 and start winding 28 and the magnetic field generated in start winding 28 is accordingly reduced. As current continues to flow through cutout switch 32 and PTCR 34, the current continues to heat bimetal element 40 and PTCR 34. Eventually, PTCR 34 will reach a steady state of high resistance at the Curie Temperature that prevents any appreciable current from flowing into start winding 28 and substantially electrically disassociates PTCR 34 from start winding 28. When PTCR 34 is substantially disassociated with start winding 28, run capacitor is substantially associated with start winding 28. Under such conditions, start winding 28 functions as an auxiliary main winding.

The PTCR 34 steady state is reached at approximately the same time motor 14 is brought up to speed. Subsequently, bimetal element 40 reaches its transition temperature so that bimetal element 40 deflects and moves movable contact 38 away from stationary contact 36 and opens the circuit through cutout switch 32.

Figure 2:
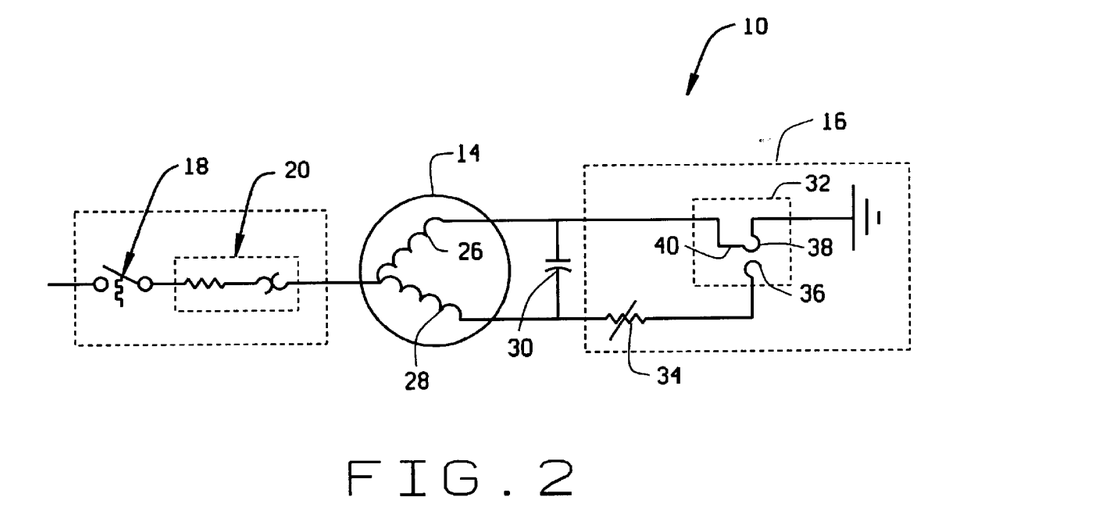
FIG. 2 is a circuit schematic of the compressor circuit shown in FIG. 1 with the start switch in an open position.

FIG. 2 is a schematic of compressor 10 with cutout switch 32 in an open position. Power is supplied to motor 14 through thermostat 18 and overload protector 20. Thus, run winding 26 is energized and maintains rotor rotation. Run capacitor 30 remains in the motor circuit and is electrically connected to run winding 26 and start winding 28. Start winding 28 therefore functions as an auxiliary winding.

Current continues to flow through run winding 26 and bimetal element 40, and consequently heat is generated in bimetal element 40 to keep bimetal element 40 in its deflected position where moveable contact 38 and stationary contact 36 are separated and electrical contact through cutout switch 32 is broken. PTCR 34 is thus disconnected from the circuit and power consumption by PTCR 34 is therefore avoided. While bimetal element 40 dissipates electrical power as heat when cutout switch 32 is open, power dissipation of cutout switch 32 is a small fraction of the power consumption of PTCR 34, and is generally on the order of minor power losses occurring in wires and electrical connectors. Therefore, as run capacitor 30 generally does not dissipate power, an increased percentage of electrical power delivered to motor 14 through thermostat 18 and overload protector 20 is dissipated in run winding 26 and start winding 28. Practically speaking, electrical power to motor 14 is dissipated only in run winding 26 and start winding 28 when cutout switch 32 is in the open position. Therefore, the energy efficiency rating of compressor 10 is increased.

Once cutout switch 32 is opened, PTCR 34 begins to cool and return to its initial state of low resistance. After power is disconnected to motor 14 via thermostat 18 or overload protector 20, current ceases to flow through bimetal element 40. Bimetal element 40 therefore begins to cool and reset to its initial closed position where an electrical connection is established through stationary contact 36 and movable contact 38. Start switch 16 is then ready for motor restart.

Figure 3:
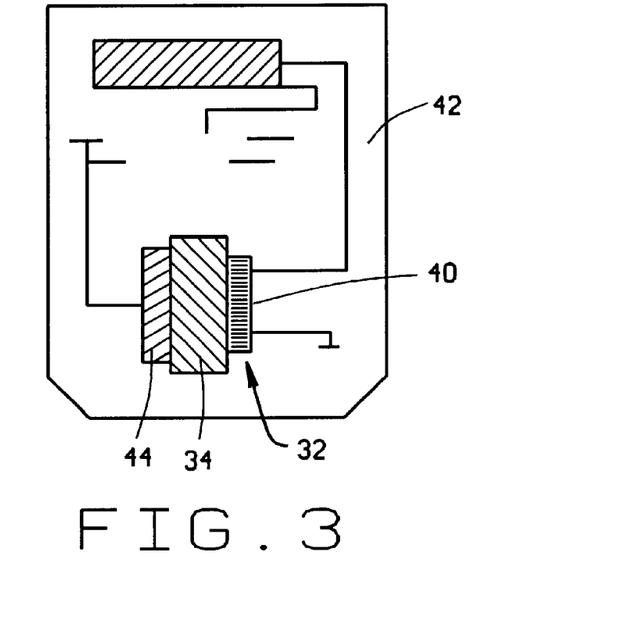
FIG. 3 is a plan view of a switch mount for the start switch shown in FIGS. 1 and 2.
Figure 4:
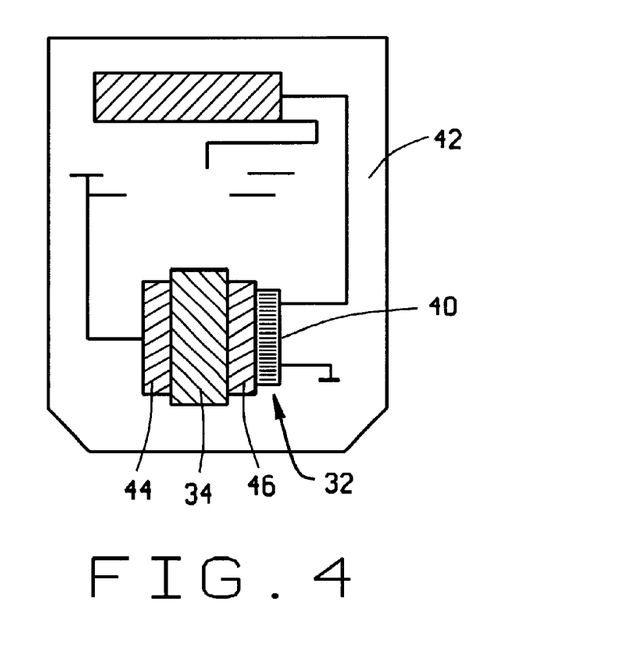
FIG. 4 is a plan view of an alternative embodiment of the switch mount shown in FIG. 3.
Figure 5:
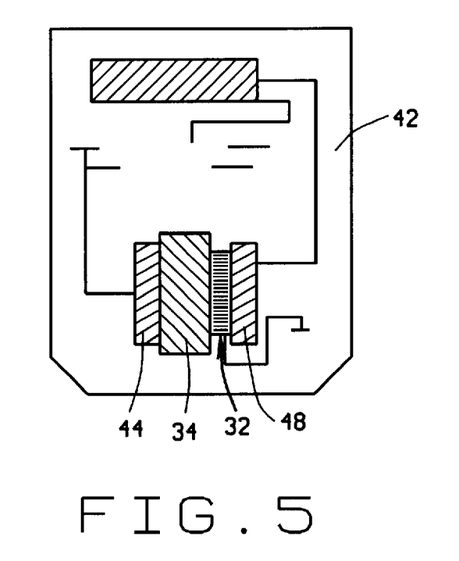
FIG. 5 is a plan view of an alternative embodiment of the switch mount shown in FIG. 4.

FIGS. 3, 4 and 5 illustrate alternative switch mounts that facilitate heat transfer from PTCR 34 to bimetal element 40 and provides additional heat to open cutout switch 32 more quickly or effectively in a particular application. Cutout switch 32 is positioned adjacent PTCR 34 in a switch housing 42 fabricated from a non-electrically conducting material, such as VALOX® plastic manufactured by General Electric Company. As shown in FIG. 3, cutout switch bimetal element 40 is positioned immediately adjacent and in thermal contact with PTCR 34 within switch housing 42. A metallic pressure plate 44 holds PTCR 34 in position relative to switch housing 42 and pushes against a metallic coating of PTCR 34 with spring-like fingers (not shown) that ensure electrical connection of PTCR 34.

FIG. 4 illustrates an alternative switch mount where cutout switch 32 is spaced from PTCR 34 using a second pressure plate 46 in between PTCR 34 and cutout switch 32. Distancing cutout switch from PTCR 34 retards heat transfer from PTCR 34 to cutout switch 32 and increases the time required for bimetal element 40 to reach its transition temperature.

FIG. 5 illustrates yet another alternative switch mount employing a third pressure plate 48 sandwiching cutout switch 32 between PTCR 34 and pressure plate 48. Thus, pressure plate 48 pushes cutout switch 32 against the metallic coating of PTCR 34 and ensures maximum heat transfer from PTCR 34 to cutout switch bimetal element 40.

In all the above-described switch mounts, heat is generated by the current flowing through PTCR 34, the temperature of PTCR increases and warms bimetal element 40. Heat transferred from PTCR 34 combines with heat generated by current flowing through bimetal element 40 to warm bimetal element 40 to its transition temperature. In an alternative embodiment, the PTCR and the cutout switch are connected in thermal contact with one another on a circuit board.

With proper positioning of cutout switch 32 relative to PTCR 34, as partially demonstrated in FIGS. 3–5, it can be ensured that cutout switch 32 is opened after PTCR 34 has reached its high resistance state. By spacing PTCR 34 a predetermined distance from cutout switch bimetal element 40, heat transfer from PTCR to bimetal element 40 does not occur until PTCR 34 has a sufficiently high resistance. Only then will PTCR 34 generate the required heat to bridge the separation between PTCR 34 and bimetal element 40. Thus, heat transfer can be accelerated or retarded with the relative spacing of PTCR 34 and cutout switch 32 to optimize the time required to heat cutout switch bimetal element 40 to the transition temperature.

Once bimetal element 40 deflects and cutout switch 32 is opened, PTCR 34 is electrically disconnected from the circuit and begins to cool, reducing the heat input to bimetal element 40. Heat generated by the current flowing through bimetal element 40 maintains cutout switch 32 open. When motor 14 is turned "OFF," current ceases to flow through bimetal element 40, and cutout switch 32 cools and resets to the closed position. The reduced heat input from PTCR 34 reduces the reset time of bimetal element 40 since there is less heat to dissipate before cutout switch 32 can be reset.

Figure 6:
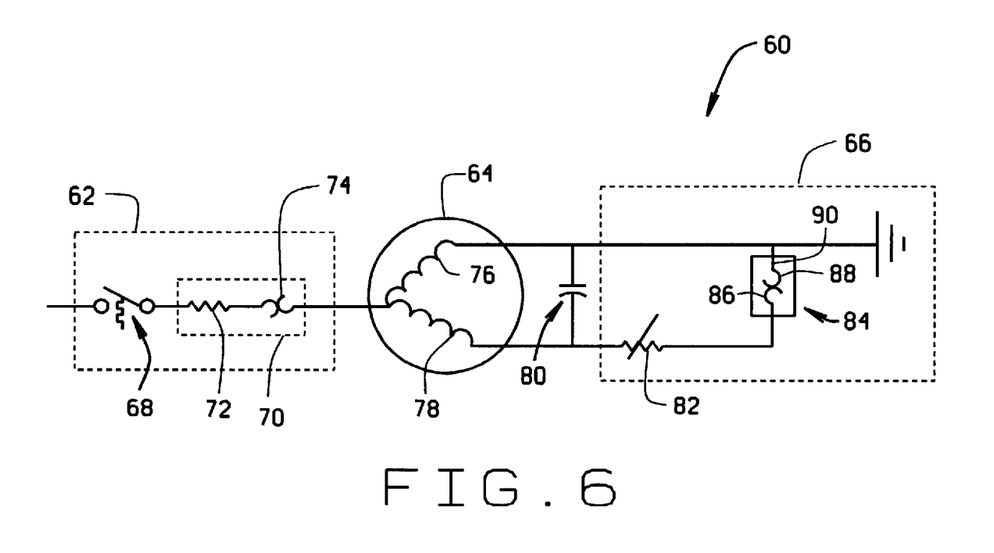
FIG. 6 is a circuit schematic of a second embodiment of a refrigerator compressor circuit including a start switch.

FIG. 6 is a circuit schematic of a second refrigerator compressor 60, including a motor control 62, a motor 64, and a start switch 66. Motor control 62 includes a thermostat 68 and an overload protector 70 including a heater element 72 and a bimetal element 74 that deflects and electrically disconnects motor run winding 76 and motor start winding 78 from damage due to fault conditions. A run capacitor 80 is connected in series with start winding 78 so that start winding 78 may be utilized as an auxiliary winding once the operating speed of motor 64 is achieved.

Start switch 66 includes a PTCR 82, and a cutout switch 84 including a stationary contact 86, a movable contact 88, and a bimetal element 90 which is attached to movable contact 88. Bimetal element 90 is heated to its transition temperature from current running therethrough and from PTCR 82 so that bimetal element 90 deflects and thereby moves movable contact 88 away from stationary contact 86 to break the circuit through cutout switch 84 and electrically disconnect PTCR 82. Cutout switch 84 and PTCR 82 are connected in series with start winding 78 so that when start winding 78 is de-energized, PTCR 82 is also de-energized. Unlike the exemplary embodiments of FIGS. 1–3, current does not flow through cutout switch bimetal element 90 when cutout switch 84 is opened since cutout switch 84 is not in series with run winding 76. Rather, heat to maintain cutout switch bimetal element 90 in deflected position is provided from overload protector heater element 72.

Figure 7:
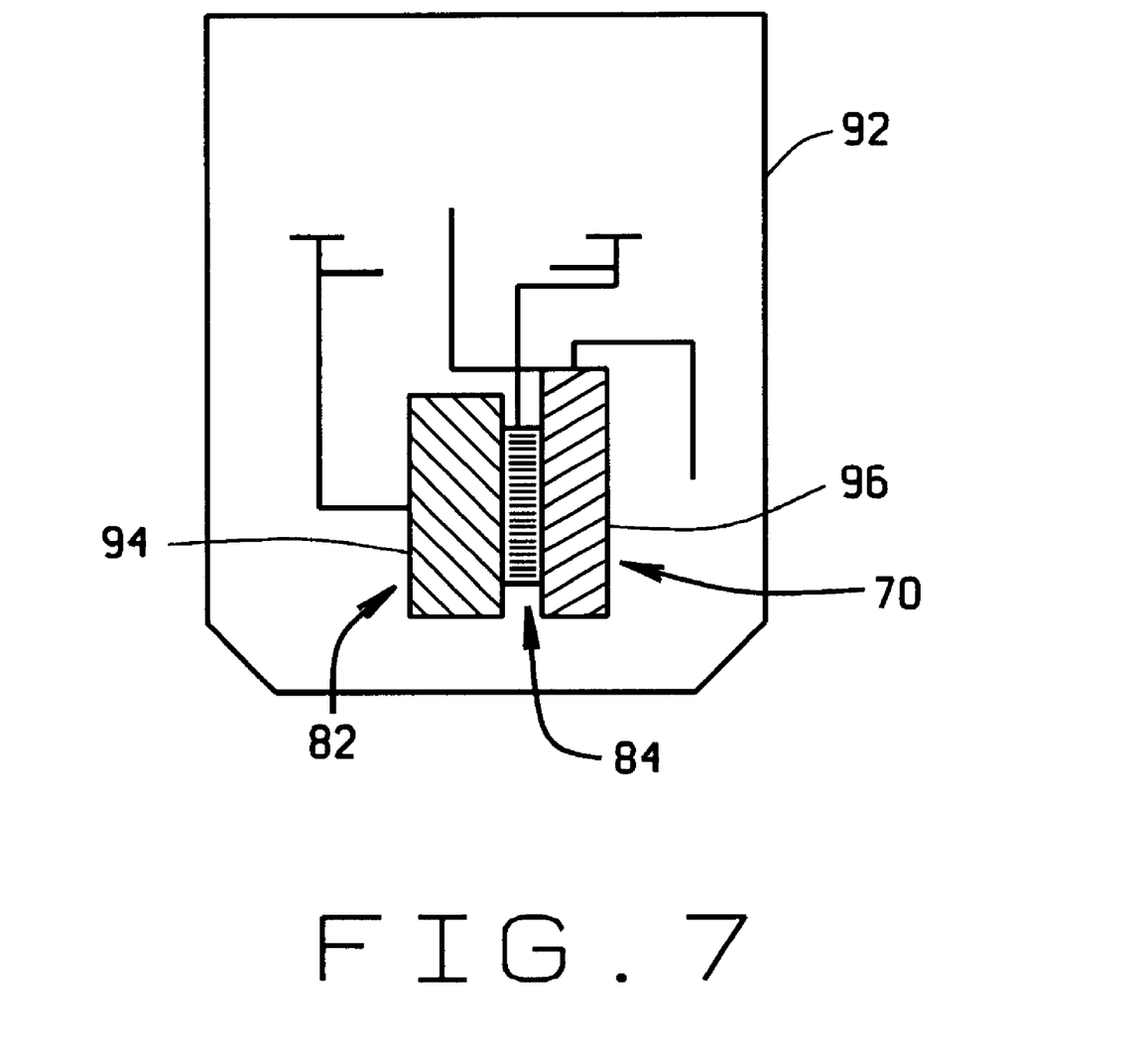
FIG. 7 is a plan view of a switch mount for the start switch shown in FIG. 6.

FIG. 7 illustrates a switch mount that facilitates heat transfer from overload protector 72 (shown in FIG. 6) and PTCR 82 to cutout switch 84. Cutout switch 84 is located in thermal contact with both PTCR 82 and overload protector 70 in a plastic switch housing 92. PTCR 82 is positioned within switch housing 92 and held in place with at least one pressure plate (not shown) as described above with reference to FIGS. 3–5. Thus, when PTCR 82 is heated by current flowing therethrough, heat generated from PTCR 82 is transferred to cutout switch 84. Overload protector 70 is located within an overload protector housing 96 that is heated as heater element 72 within overload housing 96 is heated by current flowing therethrough. Heat from overload housing 96 is also transferred to cutout switch 84.

After cutout switch 84 opens, no current flows through either cutout switch 84 or PTCR 82. As long as motor 14 is running, overload heating element 72 will transfer heat to cutout switch bimetal element 90 (shown in FIG. 6) and keep cutout switch 84 open.

PTCR 82 and overload protector housing 96 may be spaced from cutout switch 84 to ensure that bimetal element 90 does not deflect prematurely and open cutout switch 84 before PTCR 82 reaches its high resistance state. In alternative embodiments similar to FIGS. 3–5 describe above, cutout switch bimetal element 90 contacts PTCR 82 and/or overload protector housing 96 to accelerate heat transfer, or is spaced farther from PTCR 82 and/or overload protector housing 96 to retard heat transfer. In an alternative embodiment, heat transfer is accelerated or retarded by fabricating overload protector housing 96 from a greater or lesser heat conducting material. In yet another alternative embodiment, PTCR 82 and cutout switch 84 are positioned in thermal contact on a circuit board rather than on mounting plate 92.

Thus, by utilizing heat generated from existing components in the circuit to supplement heat generated from current flowing through a bimetal cutout switch, the bimetal cutout switch may be opened and maintained in an open position without introducing additional electrical power to the system. Due to additional heat input to the bimetal element, the bimetal reliably opens a bimetal cutout switch in less time without affecting the efficiency rating of the motor.

While the invention has been described in terms of various specific embodiments, those skilled in the art will recognize that the invention can be practiced with modification within the spirit and scope of the claims.

What is claimed is:

1. A motor start switch for an electric motor, the motor including a run winding, a start winding, and a run capacitor electrically connected to one another, said start switch comprising:

a temperature responsive resistor element electrically connected in series with the start winding, said temperature responsive resistor element being heated by current running therethrough; and a cutout switch electrically connected in series with the start winding, said cutout switch comprising a bimetal element, said bimetal element in heat transfer relationship with said temperature responsive resistor element such that said cutout switch and said temperature responsive resistor element are in series and in direct thermal contact, said bimetal element deflecting at a predetermined temperature to put the start winding and the temperature responsive resistor element in open circuit relation with respect to a power source; and at least one pressure plate coupled to at least one of said temperature responsive resistor element and said cutout switch.

2. A switch in accord with claim 1 wherein said bimetal element is integral to said temperature responsive resistor element.

3. A switch in accordance with claim 1 wherein said pressure plate contacting said temperature responsive resistor element.

4. A start switch in accordance with claim 1 wherein the motor further includes an overload protector, said bimetal element in heat transfer relationship with said overload protector.

5. A start switch in accordance with claim 4 wherein the overload protector comprises a housing, said bimetal element in thermal contact with the overload protector housing.

6. A start switch in accordance with claim 1 wherein said cutout switch is operable between a closed position in which said bimetal element completes an electrical circuit through said cutout switch, and an open position in which said bimetal element breaks an electrical connection through said cutout switch, such that current flows through said bimetal element when said bimetal element is in said open position.

7. A motor start switch for an electric motor, the motor including a run winding, a start winding and an overload protector, the overload protector comprising a heating element, said start switch comprising:

a temperature responsive resistor element electrically connected in series with the start winding;

a cutout switch comprising a bimetal element, the cutout switch electrically connected in series with said temperature responsive resistor element and the start winding, said bimetal element receiving heat from said temperature responsive resistor element and the overload protector heating element, such that said cutout switch and said temperature responsive resistor element are in series and in direct thermal contact, said bimetal element deflecting at a predetermined temperature to put the start winding and the temperature responsive resistor element in open circuit relation with respect to a power source; and at least one pressure plate coupled to at least one of said temperature responsive resistor element and said cutout switch.

8. A motor start switch in accordance with claim 7 wherein said at least one pressure plate contacting said temperature responsive resistor element.

9. A motor start switch in accordance with claim 7 wherein said at least one pressure plate contacting said cutout switch.

10. A motor start switch in accordance with claim 9 wherein the overload protector heating element is surrounded by an overload protector housing, and said cutout switch is positioned in thermal contact with the overload protector housing.

11. A motor start switch in accordance with claim 9 wherein said cutout switch is positioned between said overload protector heating element and said temperature responsive resistor element.

12. A start switch in accordance with claim 7 wherein said cutout switch is operable between a closed position in which said bimetal element completes an electrical circuit through said cutout switch, and an open position in which said bimetal element breaks an electrical connection through said cutout switch, such that current flows through said bimetal element when said bimetal element is in said open position.

13. A method for assembling a start switch for an electric motor, the motor including a start winding and a run winding, the method comprising the steps of:

electrically connecting a bimetal cutout switch in series with the start winding, the cutout switch comprising a bimetal element;

electrically connecting a temperature responsive resistor element in series with the bimetal cutout switch, the temperature responsive resistor element configured to be heated by current running therethrough;

positioning the cutout switch in thermal contact with the temperature responsive resistor element such that the cutout switch and the temperature responsive resistor element are in series and in direct thermal contact, the bimetal element configured to deflect at a predetermined temperature to put the start winding and the temperature responsive resistor element in open circuit relation with respect to a power source; and coupling at least one pressure plate to at least one of the temperature responsive resistor element and the cutout switch.

14. A method in accordance with claim 13 wherein the bimetal cutout switch includes a bimetal element, said method further comprising the step of electrically connecting the bimetal cutout switch in series with the run winding such that the bimetal cutout switch has an open position in which an electrical connection through the switch is broken, and current flows through the bimetal element when the bimetal cutout switch is in the open position.

15. A method in accordance with claim 13 wherein the motor includes an overload protector heating element electrically connected in series with the start winding and the run winding, said method further comprising the step of positioning the cutout switch in thermal contact with the overload protector heating element so that the bimetal element receives heat from the temperature responsive resistor element.

16. A method in accordance with claim 14 wherein the motor further includes a run capacitor electrically connected in series with the start winding, said method further comprising the step of utilizing the start winding as an auxiliary winding when the bimetal cutout switch is in the open position.

17. A method in accordance with claim 13 wherein the step of electrically connecting the temperature responsive resistor element comprises mounting the temperature responsive resistor element in contact with at least one pressure plate.

18. A method in accordance with claim 17 wherein the step of electrically connecting the temperature responsive resistor element comprises positioning the temperature responsive resistor element between two pressure plates.

19. A method in accordance with claim 18 wherein said step of mounting the bimetal cutout switch and the temperature responsive resistor comprises the step of mounting the bimetal cutout switch so that the bimetal cutout switch contacts the temperature responsive resistor.

* * * * *

UNITED STATES PATENT AND TRADEMARK OFFICE
CERTIFICATE OF CORRECTION

PATENT NO.   : 6,249,104 B1                                               Page 1 of 1
DATED        : June 19, 2001
INVENTOR(S)  : Janicek It is certified that error appears in the above-identified patent and that said Letters Patent is hereby corrected as shown below:

Column 3,
Line 48, delete "in" and insert therefor -- is --.
Line 53, after "PTCR" (shown twice) insert therefor in bolded font -- 34 --.
Line 57, between "PTCR" and "is" insert therefor in bolded font -- 34 --.

Column 4,
Line 26, between "PTCR" and "is" insert therefor in bolded font -- 34 --.
Line 30, delete bolded font "30" and insert therefor -- 30º --.
Line 44, after "run capacitor" insert therefor in bolded font -- 30 --.

Column 5,
Line 51, between "PTCR" and "increases" insert therefor in bolded font -- 34 --.
Line 55, between "PTCR" and "and" insert therefor in bolded font -- 34 --.
Line 62, between "PTCR" and "to" insert therefor in bolded font -- 34 --.

Column 6,
Line 63, delete "describe" and insert therefor -- described --.

Column 8,
Line 18, delete "contacting" and insert therefor -- contacts --.

Signed and Sealed this

Fifth Day of August, 2003

JAMES E. ROGAN
*Director of the United States Patent and Trademark Office*